Aug. 3, 1926.
H. D. TAYLOR
CAR TRUCK
Filed Jan. 15, 1926
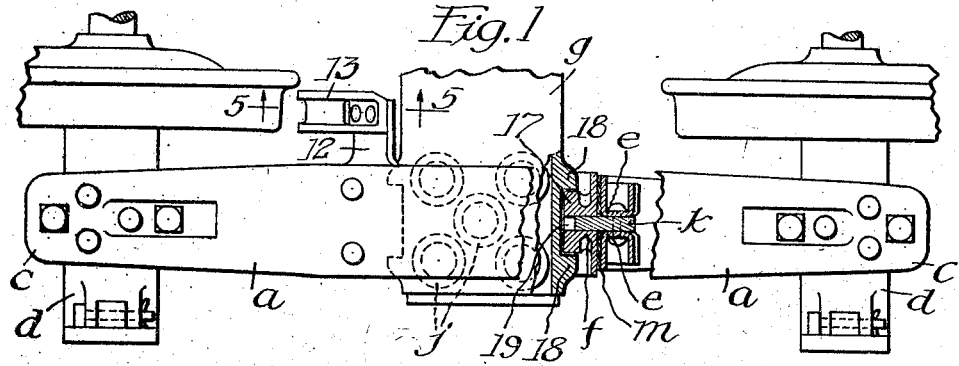
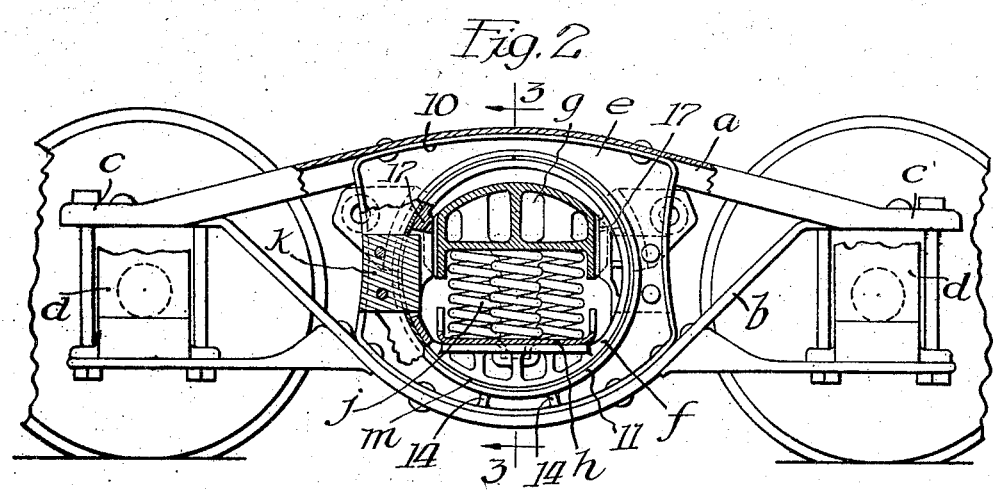
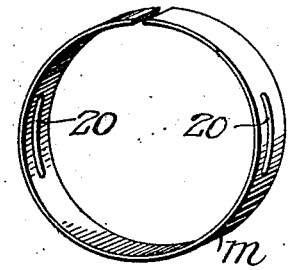
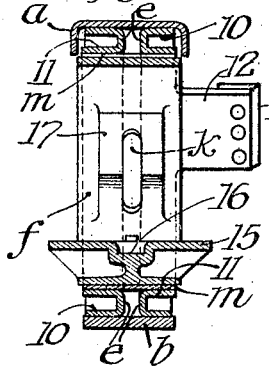
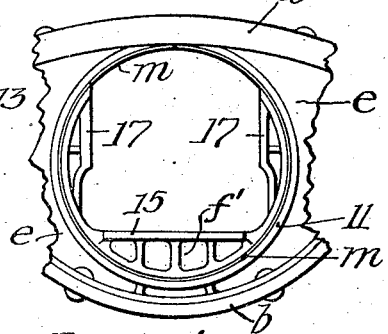
Inventor:
Howard D. Taylor,
by Fisher, Towle, Clapp + Soans
Attys.

Patented Aug. 3, 1926.

1,594,646

UNITED STATES PATENT OFFICE.

HOWARD D. TAYLOR, OF NEW YORK, N. Y.

CAR TRUCK.

Application filed January 15, 1926. Serial No. 81,380.

The invention relates to car trucks and more particularly to that type of car truck set forth in prior applications for patent filed by me in the United States Patent Office May 16, 1924, Serial Nos. 713,675 and 713,676, and in which the supporting means for the truck bolster and bolster springs are journaled in enlarged, cylindrical bearing openings in the central portions of the side frames and are interlocked therewith to permit the relative rocking movement of the side frames in vertical planes as the truck passes over irregularities in the track.

As set forth in the above noted prior applications, the truck side frames are formed of cast or pressed steel and the bolster carriers, which are preferably in the form of rings, one journaled in the enlarged central bearing opening of each side frame, are preferably formed of cast steel. The present invention seeks to provide improved means for maintaining the steel bolster carrier and side frame out of contact and which will, without necessitating expensive careful machining of the parts, facilitate the rocking movement of the side frames so that the truck wheels will follow irregularities of the track even at high speeds. To this end, the invention provides a thin liner strip for the enlarged central bearing opening of the truck side frame which is formed of hard, rolled, non-ferrous sheet metal, and preferably of a thin strip of rolled, spring brass, all as hereinafter set forth, illustrated in the preferred form in the accompanying drawing, and more particularly pointed out in the appended claims.

In the drawings:

Fig. 1 is a plan view of one side of the car truck to which the present improvement is applied, part being shown in horizontal section.

Fig. 2 is a side elevation with parts shown in vertical section.

Figure 3 is a vertical cross section on the line 3—3 of Fig. 2.

Fig. 4 is a perspective view of the improved liner strip.

Fig. 5 is a detail view in section on the line 5—5 of Fig. 1.

Fig. 6 is a side elevation of a portion of the side frame illustrating a modified form of the bolster carrier.

The truck side frames may be formed of pressed or cast steel. That illustrated is similar to the truck side frame shown and described in the above noted prior application, Serial No. 713,676, and comprises reversely arched compression and tension members $a$ and $b$ having horizontal extensions at their ends which are riveted together to form arms $c$ that rest upon the journal boxes $d$. Vertical plate sections $e$ extend between the central portions of the compression and tension members and are provided with out-turned edge flanges 10 riveted to such members and with circular openings defined by out-turned flanges 11 which form the bearing openings in the side frames for the bolster carriers. Preferably, as most clearly indicated in Fig. 3, the two plate sections $e$ of each side frame are spaced apart. In the preferred construction shown, the flange 11 of the inner section $e$ is provided with projecting portions or extensions 12 to which brake beam suporting lugs 13 can be conveniently riveted. Preferably, also, stiffening pieces 14 are welded in place between the flanges 10 and 11 below the bearing opening.

Preferably, as noted, the means employed for supporting the bolster and bolster springs comprises carrier rings $f$, one mounted in the bearing opening of each side frame, and having openings for receiving the ends of the truck bolster $g$ and spring plank $h$. The end of the spring plank rests upon a suitable sill or seat 15 formed at the lower end of the bolster opening of the carrier and has a depending stud which engages a socket 16 in the sill to detachably interlock the spring plank and carrier ring. At the sides of its opening, the carrier ring is provided with guide lugs 17 so arranged that the end of the truck bolster can be inserted into the enlarged lower portion of the opening of the carrier ring and then raised to bring lugs 18 thereon into interlocking relation with the guide lugs 17, the bolster being supported as usual in raised position by springs $j$ interposed between its ends and the ends of the spring plank. The carrier ring to which the ends of the bolster and spring plank are thus detachably interlocked, is interlocked with the side frame to permit the relative rocking movement of the latter by means of keys $k$ positioned between and bolted to the plate sections $e$ and engaging elongated openings or slots 19 in the sides of the carrier ring.

The carrier ring instead of having a journal fit in the bearing opening of the side frame, as set forth in the prior applications referred to, is slightly smaller than the bearing opening and is held out of contact with the side frame by a thin liner strip *m* for the bearing opening which is formed of a strip of rolled, hard, non-ferrous metal, and preferably of spring brass. Preferably, the diameter of the steel carrier ring is about one-eighth of an inch smaller than the bearing opening in the steel side frame and the non-ferrous or brass liner strip is preferably about a thirty-second of an inch in thickness. The liner strip is rolled to such shape that when fitted within the bearing opening in the side frame it will tend to spring outwardly into snug engagement with the walls of the opening and it is of such length that when so disposed its free ends are closely adjacent. The liner is formed at its sides with slots 20 through which the keys *k* extend, these slots being only slightly longer than the width of the keys so that the latter hold the liner in position and prevent excessive relative movement between it and the side frame. Preferably, as shown, the liner is positioned with its free ends at the top of the bearing opening.

Such a thin, rolled liner strip for the bearing opening requires no machining and its use also avoids the necessity of carefully machining the bearing surfaces of the side frame and carrier ring. Furthermore, as it is formed of rolled, hard, non-ferrous metal or spring sheet brass, it is extremely durable and it is found to greatly facilitate the rocking movements of the side frames. In other words, the improvement provides cheap, efficient means for insuring the proper engagement of the wheels of the truck with the track despite irregularities therein, and even at high speeds. Furthermore, the liner strip bridges the gap between the spacing sections or plates *e* and when employed the opening of the bolster carrier may, if desired, be opened at the top. Such a modified bolster carrier *f'* is shown in Fig. 6. It is also noted that the present improvement can be employed to advantage in connection with the cast metal side frame such as shown in the prior application, Serial No. 713,675.

Obviously, changes may be made in the details set forth without departure from the scope of the appended claims.

I claim as my invention:

1. A steel car truck comprising side frames having enlarged central bearing openings, bolster supporting means journaled in said openings, and liners formed of hard, non-ferrous sheet metal for the bearing openings, substantially as described.

2. A steel car truck comprising side frames having enlarged central bearing openings, bolster supporting means journaled in said openings, liners for the bearing openings formed of rolled, hard, sheet metal strips, and means interlocking the side frames, bolster supporting means and liners in a manner permitting the limited rocking movement of the side frames, substantially as described.

3. A steel, car-truck side-frame having an enlarged central bearing opening, a steel carrier having a bolster opening journaled in the bearing opening of the side frame, and a liner for the bearing opening formed of non-ferrous, hard metal, substantially as described.

4. In combination, a steel car truck side-frame, a steel bolster carrier journaled in the side frame and a rolled, spring sheet metal, liner-strip interposed between the side frame and carrier.

5. In combination, a steel car-truck side-frame, a one-piece, steel bolster-carrier journaled in the side-frame, a hard, non-ferrous, sheet-metal liner-strip interposed between the side frame and carrier, and key means detachably interlocking said parts in a manner permitting the relative rocking movement of the side frame and carrier, substantially as described.

6. In combination, a steel, car-truck side-frame having an enlarged, central portion provided with a cylindrical bearing opening, a liner for the opening formed of hard, non-ferrous sheet metal, a U-shaped, steel, bolster carrier journaled in said opening and means detachably interlocking said parts in a manner permitting the relative oscillation of the side frame and carrier, substantially as described.

7. In combination, a pressed-steel, car-truck side-frame comprising compression and tension members and a central section formed of spaced vertical plates having outer and inner out-turned flanges, the latter forming a central bearing opening, a liner of hard, non-ferrous metal within said opening and bridging the space between said plates, and a bolster-carrier journaled in said opening, substantially as described.

HOWARD D. TAYLOR.